Dec. 4, 1951  C. R. JOHNSTON  2,577,525
APPARATUS FOR DIGGING POTATOES AND THE LIKE
Filed Feb. 24, 1948  2 SHEETS—SHEET 2
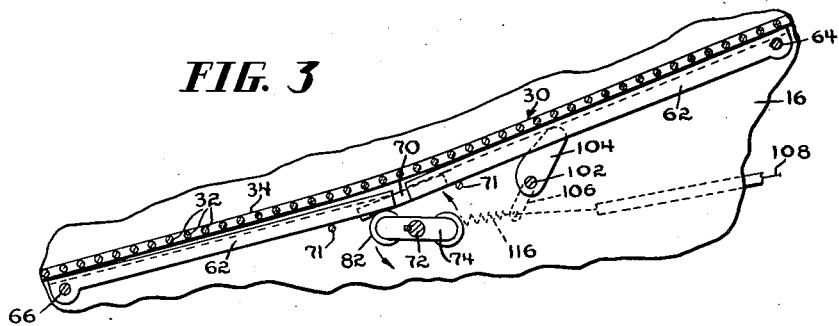
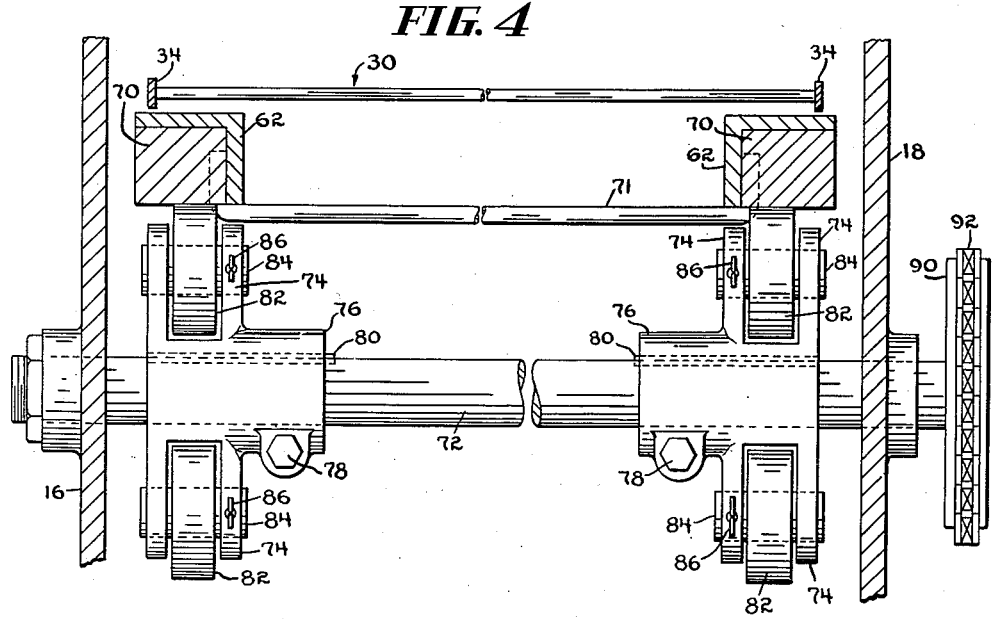
INVENTOR
CLAIR R. JOHNSTON
BY
Oldham & Oldham
Attorneys Patented Dec. 4, 1951

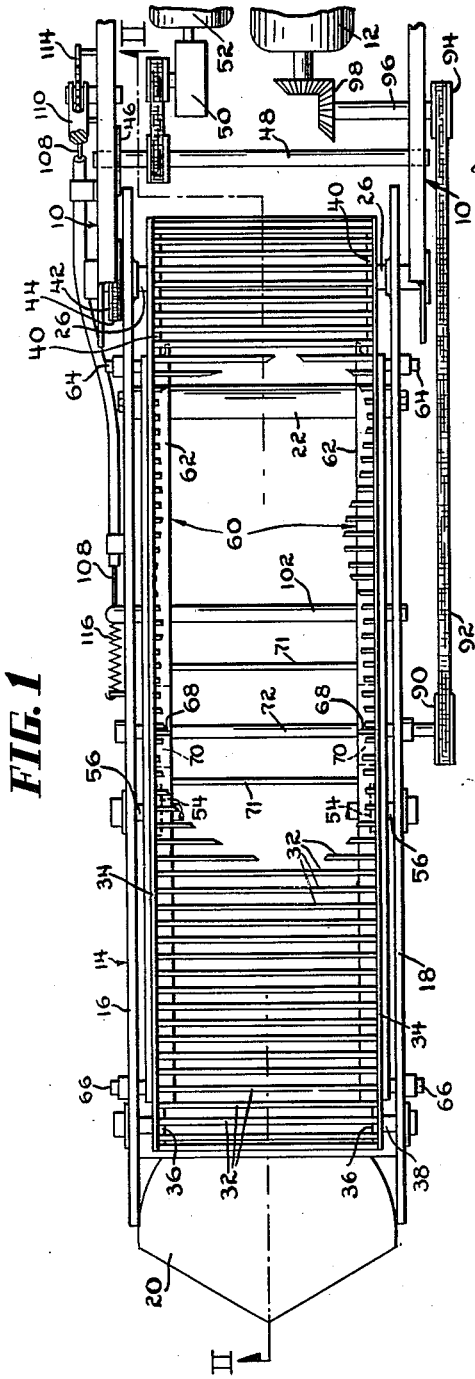

2,577,525

UNITED STATES PATENT OFFICE 2,577,525

APPARATUS FOR DIGGING POTATOES AND THE LIKE

Clair R. Johnston, Akron, Ohio

Application February 24, 1948, Serial No. 10,248

9 Claims. (Cl. 55—137)

1

This invention relates to apparatus for digging potatoes, peanuts, and the like, from the ground, and, more particularly, is concerned with improved mechanisms for separating dirt from the dug product.

Machines have been proposed and built heretofore for digging potatoes, and the like, such means including a plow at the front end of the machine for digging up the dirt and potatoes with a conveyor of perforate character receiving the dirt and potatoes from the back end of the plow. The perforate conveyor is adapted to permit the dirt to fall through the conveyor back to the ground while the conveyor carries the potatoes or other products upwardly for further operation or packaging.

However, known mechanisms have either failed to provide means for agitating the perforate conveyor, or have driven agitating means by the same motor or mechanisms which drive the conveyor, such motor or mechanisms being directly associated with the forward movement of the machine, with the result that in many instances, particularly when operating upon muddy or hard ground, the proper separating action of the dirt and potatoes or other product is not obtained. Moreover, the potatoes may be bruised, scraped or otherwise damaged because of inability to control the degree of agitating action.

It is the general object of my invention to avoid and overcome the foregoing and other difficulties of and objections to known machines and apparatus by the provision of improved plow and perforate conveyor combinations wherein independently driven and controllable agitating means are associated with the perforate conveyor.

Another object of my invention is to provide apparatus of the character described wherein the degree and amount of agitating action can be varied within wide limits to obtain the best dirt separating action under any given set of conditions.

Another object of my invention is the provision of potato digging apparatus including a plow and a perforate conveyor wherein the conveyor is positively agitated by mechanism operated by a motor or means entirely independent of the motor or means driving the conveyor, and variably independent of the forward movement of the apparatus over the ground.

The foregoing objects of my invention, and other objects which will become apparent as the description proceeds, are achieved by the provision of apparatus including a plow, an endless

2 perforate conveyor positioned behind the plow to receive the potatoes and dirt dug up by the plow, means slidably supporting the side edges of the upper stretch of the conveyor, means for raising and lowering the supporting means to knock the dirt through the conveyor, separate means for limiting movement of the supporting means, motor means for driving the raising and lowering means, and other independent motor means for driving the conveyor.

For a better understanding of my invention, reference should be had to the accompanying drawing, wherein:

Fig. 1 is a fragmentary plan view of the portion of a potato digging apparatus with which my invention is primarily concerned;

Fig. 2 is a longitudinal vertical sectional view of the apparatus of Fig. 1 taken substantially on line II—II thereof;

Fig. 3 is a fragmentary view similar to a portion of Fig. 2, but illustrating the agitator control in another position; and Fig. 4 is an enlarged fragmentary transverse vertical sectional view of the agitating means as taken substantially on line IV—IV of Fig. 2.

Having reference to the drawings, the numeral 10 indicates generally the main frame of my improved apparatus for digging potatoes and the like, such main frame being mounted upon wheels (not shown) and adapted to be driven forwardly over the ground by a motor 12, usually of the internal combustion type. The main frame may include shaker tables, sorting apparatus, packaging equipment, basket racks, and the like, but these details have not been illustrated inasmuch as my present invention is primarily concerned with other features of the apparatus, all in the manner now to be more particularly described.

Secured to the front of the main frame 10 for vertical movement with respect thereto is a digger frame indicated as a whole by the numeral 14. The digger frame 14 includes side plates 16 and 18 which are connected together at their front and lower ends by a plow 20, and which are connected together adjacent their back and upper ends by suitable brace means 22. The brace means 22 may take a variety of forms but have been illustrated in the drawings as comprising a rugged metal tube positioned between the side plates 16 and 18, with a tie bolt 24 extending through the tube and side plates and joining the plates tightly together against the ends of the tube.

The digger frame 14, as just described, is adapted to be mounted in conjunction with the main frame 10 for vertical movement with respect thereto, as previously noted, and while the manner of mounting may take a variety of forms, one particularly convenient construction is to pivotally mount the back and upper end of the digger frame 14 pivotally on the main frame 10 by means of a shaft 26 which is journaled in both the digger frame and the main frame in appropriate bearings. Any suitable means are utilized to control the vertical position of the digger frame 14 with respect to the main frame 10, for example, cables 28 may extend from the digger frame 14 to suitable winch mechanisms (not shown) on the main frame.

An endless perforate conveyor, indicated as a whole by the numeral 30, is rotatably associated with the digger frame 14 being positioned to receive the dirt and potatoes from the plow 20, and being adapted to carry the potatoes back to the main frame of the apparatus while permitting the dirt to fall through the conveyor back to the ground. One reasonably satisfactory type of conveyor comprises a plurality of transversely extending metal rods positioned a short distance apart in a longitudinal direction, the rods being connected at their ends to endless link chains 34 forming the sides of the conveyor.

The endless conveyor 30, as best illustrated in Figs. 1 and 2 of the drawings, is rotatably supported at the front and lower end of the digger frame 14 by a plurality of sprockets 36 carried upon a shaft 38 journaled at its ends in the side plates 16 and 18. The back or upper end of the conveyor 30 is carried on a plurality of sprockets 40 mounted on the shaft 26. The shaft 26 is adapted to be rotated to drive the conveyor 30 in the direction shown by the arrows, and this can obviously be accomplished in a variety of ways. For example, a drive sprocket 42 mounted near one end of the shaft 26 is connected by a drive chain 44 to a sprocket 46 mounted on a jack shaft 48 journaled in the main frame 10 and adapted to be driven through the gearing or a gear reducer 50 by a motor 52, usually of the internal combustion type.

The motor 52 is preferably provided entirely independent of the motor 12, the motor 52 serving to drive the conveyor 30 and to perform operations on the shaker table, sorting apparatus, packaging equipment, and the like (not shown) associated with the main frame and the remainder of the apparatus. It is to be understood that the details of the drive may be varied to suit existing apparatus installation or maintenance problems, but that the important and preferred feature of the drive which should not ordinarily be omitted is that the conveyor 30 is driven by a motor entirely independent of the motor 12 for moving the apparatus over the ground.

The lower reaches of the conveyor 50 may be supported by one or more sets of idler sprockets 54 mounted on a shaft 56 journaled in the side plates 16 and 18 of the digger frame.

The upper stretch or reach of the conveyor 30 is supported usually at the edges of the conveyor by means of a sub-frame indicated as a whole by the numeral 60. Conveniently, the sub-frame 60 is formed of angle irons 62 positioned as shown in Figs. 1 and 4, with the vertically extending flanges thereof on the inside to prevent any wedging of stones between the vertical flanges and the side plates 16 and 18 of the digger frame. The upper and back ends of the angles 62 are pivotally supported on pins 64 mounted on the sides plates 16 and 18, and the lower and forward ends of the angles 62 are pivotally supported on pins 66 carried by the side plates. The angles 62 of the sub-frame 60 are split transversely near their centers, as at 68, and a transversely extending bridging plate 70 bridges the transverse split 69, all in the manner illustrated in Figs. 1 to 4. The plate 70 is usually connected, as by welding, to one, such as the upper, of the sub-frame sections.

Journaled between the side plates 16 and 18 and positioned beneath the bridging plate 70 is a shaft 72 which has striker arms 74 mounted thereon, as seen in Fig. 4, so that the striker arms are positioned beneath the angles 62 in the region of the bridging plate 70. The striker arms 74 include split hub portions 76 secured by bolts 78 to the shaft 72, and keys 80 function in addition to lock the striker arms on the shaft 72. The striker arms 74 are preferably bifurcated to receive rollers 82 journaled on axles 84 fastened between the fifurcated arms. Cotter pins 86 lock the axles 84 in the bifurcated arms. Usually the striker arms 74 associated with each hub portion 76 are two in number and are diametrically opposed, although more or less than the two arms illustrated could be utilized.

The agitating mechanism for the conveyor 30 as just described is adapted to be driven by any suitable mechanism. In the embodiment of the invention illustrated such mechanism comprises a sprocket 90 mounted on the end of the shaft 72, and driven by a chain 92 from a sprocket 94 carried on a shaft 96 connected through gearing 98 to the motor 12. Again, it will be understood, that the details of the drive from the motor 12 to the shaft 72 may take a variety of forms, but that the important and preferred combination is to utilize the motor 12 to drive the agitating means for the conveyor 30. This is important for the reason that the drive for the agitating means is thus made independent of the drive for the conveyor 30 as provided by the motor 52.

The result is that the agitation of the conveyor is independent of the movement of the conveyor and a much better separating action is obtained. Preferably and usually the gearing connection to and the drive from the motor 12 for operating the agitating means is such that the drive of the agitating means is in direct response to the speed of the motor 12. In other words, the drive to the agitating means from the motor 12 is not connected to the propeller shaft or wheel moving drive of the motor 12 which is separated from the motor 12 by a transmission. Thus, if it becomes necessary to shift into second or low in the transmission associated with the motor 12 in order to drive the main frame 10 of the apparatus over the ground, and the forward speed of movement of the apparatus over the ground is relatively slow, nonetheless, the agitating means will be still operated in direct response to the speed of the motor 12 regardless of the position of the transmission.

Mechanisms are associated with the agitating means for controlling the extent of movement of the sub-frame. Such mechanism in the form of the invention illustrated comprises a shaft 102 journaled between the side-plates 16 and 18, the shaft carrying a pair of cams 104 which engage with the sub-frame underneath the angles 62 thereof. Turning the shaft 102 will rotate the cams 104 to any one of a plurality of positions for adjustably limiting the downward movement of the sub-frame and thus the agitating action on the conveyor 30.

The angular position of the shaft 102 and the cams 104 is controlled by securing a crank 106 to an end of the shaft and connecting a flexible cable 108 to the crank and to a lever 110 pivotally mounted at 112 on the main frame 10, the angular position of the lever 110 being controlled by a spring held detent mounted on the lever 110 which falls into an arcute segment 114 secured to the frame. A tension spring 116 is connected at one end to the crank 106 and at its other end to the side-plate 16 to operate with the cable 108 in the positioning of the cams 104.

In the operation of the apparatus described, the main frame 10 of the digger is advanced along the ground by the motor 12 operating through the transmission and drive, and the digger frame 14 is positioned at the proper vertical position to cause the plow 20 to dig dirt and potatoes from the ground which pass onto the perforate conveyor 30. The movement of the conveyor 30 in the direction shown by the arrows will carry the dirt and potatoes up the conveyor towards the main frame 10, the conveyor being driven by the motor 52. The motor 52 being independent of the movement of the main frame 10 over the ground can be adjusted to give the desired speed to the conveying action. During the movement of the dirt and potatoes on the conveyor 30 the sub-frame 60 slidably supporting the upper reaches of the conveyor will be given an agitating action by the rotation of the shaft 72 and the striking of the striker arms 74 against the bridging plate 70 to periodically raise and drop the entire central section of the conveyor. The independent drive of the agitating means from the motor 12 which is dependent upon the speed of motor 12 rather than upon the forward movement of the main frame 10 permits the best type of agitating action for any particular operating conditions of the apparatus and insures the best type of separation of the potatoes from the dirt, stones, and the like, of the material passing up the conveyor. In addition, by adjusting the lever 110 to control the position of the cams 104 a very mild to a very severe agitating action can be obtained to get the utmost of separation of the potatoes from the dirt in which they have been dug with a minimum of bruising, skinning, or other undesirable action, on the potato.

From the foregoing, it will be recognized that the various objects of my invention have been achieved by the provision of relatively inexpensive, easily operated apparatus for digging potatoes, and, particularly, for separating the dug potatoes from the dirt dug therewith.

While in accord with the patent statutes, I have specifically illustrated and described one best known embodiment of my invention, it is to be particularly understood that I am not to be limited thereto or thereby, but that the scope of my invention is defined in the appended claims.

I claim:

1. Apparatus for digging potatoes and the like including a pair of side frames, a plow supported between the forward ends of the side frames, an endless conveyor movable backwardly from the plow and supported between the side frames, said conveyor comprising essentially a plurality of laterally-extending, longitudinally-spaced rods, means for driving the conveyor independently of the forward motion of the apparatus, a main frame upon which the rear ends of the side frame are pivotally mounted, a sub-frame mounted between the side frames inside the top stretch of the conveyor, said sub-frame being pivotally secured at its front and rear ends to the side frame and being laterally split near its center, a transverse plate bridging the split in the sub-frame, a shaft journaled in the side frames below the plate, striker arms having rollers on their outer ends carried by the shaft near the ends of the plate and adapted to tilt the sub-frame and raise and lower the upper stretch of the conveyor, means independent of the means driving the conveyor for rotating the shaft, and adjustably positioned means limiting the movement of the sub-frame towards the shaft.

2. Apparatus for digging potatoes and the like including a pair of side frames, a plow supported between the forward ends of the side frames, an endless conveyor movable backwardly from the plow and supported between the side frames, means for driving the conveyor independently of the forward motion of the apparatus, a main frame upon which the rear ends of the side frame are pivotally mounted, a sub-frame mounted between the side frames inside the top stretch of the conveyor, said sub-frame being pivotally secured at its front and rear ends to the side frame and being laterally split near its center, a transverse plate bridging the split in the sub-frame, a shaft journaled in the side frames below the plate, striker arms having rollers on their outer ends carried by the shaft near the ends of the plate and adapted to tilt the sub-frame and raise and lower the upper stretch of the conveyor, means independent of the means driving the conveyor for rotating the shaft, and adjustably positioned means limiting the movement of the sub-frame towards the shaft.

3. Apparatus for digging potatoes and the like including a pair of side frames, a plow supported between the forward ends of the side frames, an endless conveyor movable backwardly from the plow and supported between the side frames, means for driving the conveyor independently of the forward motion of the apparatus, a main frame upon which the rear ends of the side frame are pivotally mounted, a sub-frame mounted between the side frames inside the top stretch of the conveyor, said sub-frame being pivotally secured at its front and rear ends to the side frame and being laterally split near its center, a shaft journaled in the side frames below the split, striker arms having rollers on their outer ends carried by the shaft near the ends of the split and adapted to tilt the sub-frame and raise and lower the upper stretch of the conveyor, means independent of the means driving the conveyor for rotating the shaft, and adjustably positioned means limiting the movement of the sub-frame towards the shaft.

4. Apparatus for digging potatoes and the like including a pair of side frames, a plow supported between the forward ends of the side frames, an endless conveyor movable backwardly from the plow and supported between the side frames, means for driving the conveyor, a main frame upon which the rear ends of the side frame are pivotally mounted, a sub-frame mounted between the side frames inside the top stretch of the conveyor, said sub-frame being pivotally secured at its front and rear ends to the side frame and being laterally split near its center, a shaft journaled in the side frames below the split, striker arms having rollers on their outer ends carried by the shaft near the ends of the split and adapted to tilt the sub-frame and raise and lower the upper stretch of the conveyor, means for rotating the shaft, and adjustably positioned means limiting the movement of the sub-frame towards the shaft.

5. Apparatus for digging potatoes and the like including a plow, an endless, perforate conveyor positioned behind the plow to receive the potatoes and dirt dug up by the plow, means slidably supporting the side edges of the upper stretch of the conveyor, means for raising and lowering said supporting means to knock the dirt through the conveyor, said means being rotary and including cranks carrying rollers at their ends which engage periodically with the supporting means, separate means for limiting the movement of the supporting means, motor means for driving the raising and lowering means, and other independent motor means for driving the conveyor.

6. Apparatus for digging potatoes and the like including a plow, an endless, perforate conveyor positioned behind the plow to receive the potatoes and dirt dug up by the plow, means slidably supporting the side edges of the upper stretch of the conveyor, means for raising and lowering said supporting means to knock the dirt through the conveyor, separate means for limiting the movement of the supporting means, said means comprising angularly adjustable cams for limiting movement of the supporting means towards the raising and lowering means, motor means for driving the rasing and lowering means, and other independent motor means for driving the conveyor.

7. Apparatus for digging potatoes and the like including a plow, an endless, perforate conveyor positioned behind the plow to receive the potatoes and dirt dug up by the plow, means slidably supporting the side edges of the upper stretch of the conveyor, said means comprising a sub-frame laterally split near its center and pivotally supported at its ends, means for raising and lowering said supporting means to knock the dirt through the conveyor, said means being rotary and including cranks carrying rollers at their ends which engage periodically with the supporting means, separate means for limiting the movement of the supporting means, said means comprising angularly adjustable cams for limiting movement of the supporting means towards the raising and lowering means, motor means for driving the raising and lowering means, and other independent motor means for driving the conveyor.

8. Apparatus for digging potatoes and the like including a plow, an endless, perforate conveyor positioned behind the plow to receive the potatoes and dirt dug up by the plow, means slidably supporting the side edges of the upper stretch of the conveyor, said means comprising a sub-frame laterally split near its center and pivotally supported at its ends, means for raising and lowering said supporting means to knock the dirt through the conveyor, said means being rotary and including cranks carrying rollers at their ends, which engage periodically with the supporting means, separate means for limiting the movement of the supporting means, motor means for driving the raising and lowering means, and other independent motor means for driving the conveyor.

9. Apparatus for digging potatoes and the like including a plow, an endless, perforate conveyor positioned behind the plow to receive the potatoes and dirt dug up by the plow, means slidably supporting the side edges of the upper stretch of the conveyor, said means comprising a sub-frame laterally split near its center and pivotally supported at its ends, means for raising and lowering said supporting means to knock the dirt through the conveyor, separate means for limiting the movement of the supporting means, said means comprising angularly adjustable cams for limiting movement of the supporting means towards the raising and lowering means, motor means for driving the raising and lowering means, and other independent motor means for driving the conveyor.

CLAIR R. JOHNSTON.

REFERENCES CITED

The following references are of record in the file of this patent:

UNITED STATES PATENTS

| Number | Name | Date |
|---|---|---|
| 103,086 | Russell et al. | May 17, 1870 |
| 765,584 | Lord | July 19, 1904 |
| 916,479 | Normandin | Mar. 30, 1909 |
| 1,163,348 | Kendall | Dec. 7, 1915 |
| 1,321,979 | Cassel | Nov. 18, 1919 |
| 1,341,454 | Aspinwall | May 25, 1920 |
| 1,512,596 | Hamshaw | Oct. 21, 1924 |
| 1,578,034 | Hoover | Mar. 23, 1926 |
| 1,580,683 | Sang | Apr. 13, 1926 |
| 2,379,198 | Templeton | June 26, 1945 |

FOREIGN PATENTS

| Number | Country | Date |
|---|---|---|
| 206,286 | Germany | Feb. 1, 1909 |